United States Patent Office 3,045,010
Patented July 17, 1962

3,045,010
21-METHYL STEROIDS AND INTERMEDIATES
Sanford K. Figdor, Gales Ferry, Ellis Rex Pinson, Jr., Waterford, Barry M. Bloom, Lyme, and Gerald D. Laubach, Niantic, Conn., assignors to Chas. Pfizer & Co., Inc., New York, N.Y., a corporation of Delaware
No Drawing. Filed Jan. 22, 1960, Ser. No. 3,995
1 Claim. (Cl. 260—239.55)

This application is concerned with a new and useful process for the preparation of valuable steroid compounds. More particularly, it is concerned with a procedure for the preparation of adrenocortically active steroids characterized by the presence of an α-hydroxy propanoyl group at the 17β-position. These latter compounds are described and claimed in copending and concurrently filed patent application, Serial No. 3,996, filed January 22, 1960. It is concerned also with certain of the valuable intermediates used in the process.

In copending and concurrently filed patent application, Serial No. 3,996, filed January 22, 1960, a new class of therapeutically useful steroid compounds characterized by the presence of an α-hydroxy propanoyl group at the 17β-position is described. These compounds have marked adrenocortical activity and are especially useful because of their favorable electrolyte properties. The process of this invention can be used to prepare compounds of this class represented by the formula

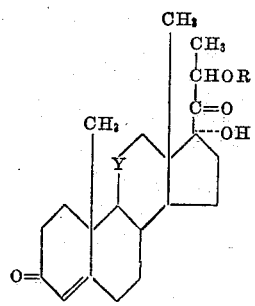

and the $\Delta^1$-, $\Delta^6$- and $\Delta^{1,6}$-dehydro analogs thereof wherein Y is selected from the group consisting of

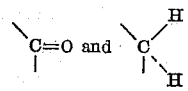

and R is selected from the group consisting of acyl groups containing only carbon, hydrogen and oxygen up to a total of five carbon atoms.

The essence of this invention is the discovery that new and useful compounds can be prepared by the use of a novel sequence of known reactions as applied to a variety of known and unknown intermediates. One aspect of this invention is set forth below in the following synthetic sequence which shows the application of the process of this invention to the preparation of 21-methyl-$\Delta^{1,4}$-pregnadiene-17α,21-diol-3,11,20-trione.

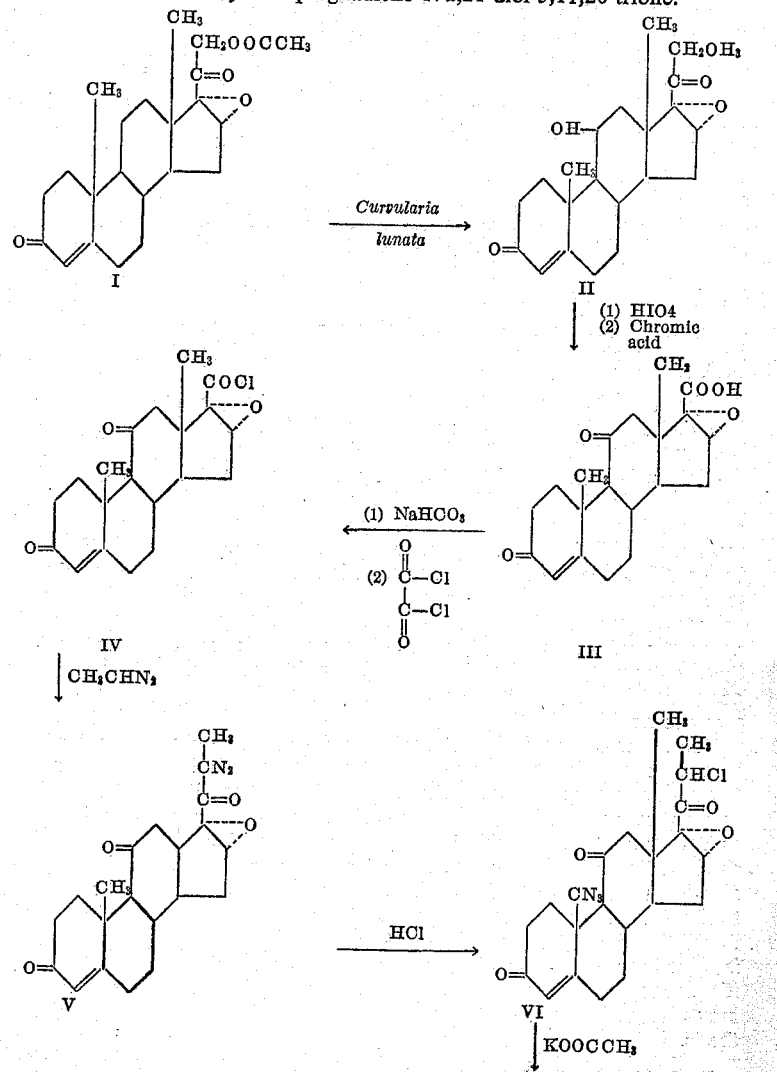

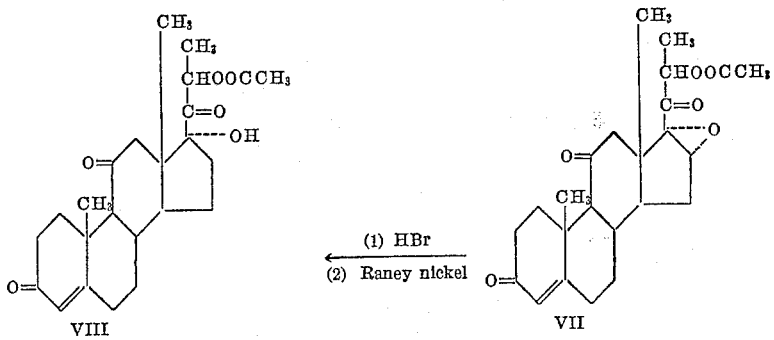

The foregoing shows only one of the possible modifications of this invention, the preparation of an 11-keto compound which is described and claimed in the abovementioned copending and concurrently filed patent application. The basic synthesis may also be carried through using an 11α-hydroxy steroid as an intermediate, the latter being introduced using, for example, *Rhizopus nigricans* in accordance with the procedure of Peterson et al. described in the Journal of the American Chemical Society, vol. 74, page 5933 (1952). Alternatively, an 11-desoxy compound can be employed and an adrenocortical active steroid may be produced at the end of the reaction sequence by the introduction of an 11β-hydroxyl group using, for example, *Curvularia lunata* as described and claimed in U.S. Patent 2,658,023, issued November 3, 1953. If desired, Compound VIII of the above reaction sequence or its $\Delta^1$-, $\Delta^6$- or $\Delta^{1,6}$-dehydro analogs can be converted to an 11-hydroxyl compound by reduction. This reduction can be effected using an alkali metal hydride such as lithium aluminum hydride or sodium borohydride after certain protective reactions. The latter is preferred since the product obtained is predominantly in the β-configuration. This configuration, as is well known, is a characteristic of adrenocortically active steroids. In any event, no matter which reagent is used, there are well-known means for separating the 11α-hydroxy compound from the 11β-hydroxy compound.

This invention is especially valuable since 11-hydroxy compounds prepared by the process of the invention can be converted to valuable 9α-halo or 9α-alkoxy-11β-hydroxyl compounds using the procedure fully described by Fried et al. in the Journal of the American Chemical Society, vol. 79, page 1130. In this procedure, the 11-hydroxyl compound is first dehydrated with methane sulfonyl chloride in pyridine and the resulting $\Delta^{9(11)}$-compound is converted to a 9β,11β-oxido compound by treatment with N-bromoacetamide and perchloric acid in peroxide-free dioxane. The resulting bromohydrin is treated with an alkaline reagent such as potassium acetate to convert the bromohydrin to the oxide. The oxido compound is next converted to a 9α-halo or a 9α-alkoxy compound by reaction with a halogen acid or with methanol or ethanol in the presence of 72% perchloric acid.

The process of this invention is applicable not only to the preparation of $\Delta^4$-compounds as represented by the above reaction sequence, but may also be applied to the preparation of the $\Delta^1$-, $\Delta^6$ and $\Delta^{1,6}$-dehydro analogs of $\Delta^4$-compounds. Double bonds at the 1,2-position or at the 6,7-position can be introduced at the start of the reaction sequence or their introduction may be deferred to the later steps of the sequence. For example, these double bonds may be introduced after the acyloxy group is already present at the 21-position and while the epoxide group is still present at the 16,17-position. They may also be introduced at a subsequent stage in the synthesis.

A double bond at the 6,7-position is introduced by treatment of the above compound with a quinone having an oxidation-reduction potential less than −0.5 at a temperature between 70° C. and 190° C. in an inert organic solvent having a boiling point of at least about 70° C. Suitable solvents include mononuclear aromatic hydrocarbons, mononuclear halogenated aromatic hydrocarbons, oxygenated polar alicyclic organic solvents and oxygenated polar aliphatic organic solvents. Typical solvents include tertiary butanol, n-amyl alcohol, hexanol, isoamyl alcohol, heptanol, 3-cyclohexanol, orthodichloro benzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate. The application of this reaction to the preparation of $\Delta^{4,6}$-androstadiene 9-halo compounds is illustrated in U.S. Patent No. 2,836,607, issued July 27, 1958. Its application to the preparation of the specific compounds of this invention is illustrated in the examples.

A double bond is introduced at the 1,2-position by contacting the steroid with selenium dioxide in an inert organic solvent at an elevated temperature. Solvents which are useful for this reaction include, for example, tertiary butanol, tertiary pentanol, benzene, ethylene glycol diethers such as dibutyl Cellosolve, dipropyl ether, ethylene glycol and various other glycol ethers, penetole, xylene, dioxane and naphthalene. Preferred conditions include the addition of a lower aliphatic acid particularly acetic acid to a tert-butanol mixture. In carrying out the reaction, it is generally preferred to utilize temperatures of from about 75° C. to about 200° C. for from about 1 hour to about 100 hours. Generally several molecular proportions of selenium dioxide are added during the reaction period. The application of this reaction is fully illustrated in copending patent application Serial No. 672,550, filed August 18, 1957. Its application to the specific compounds of this invention is fully illustrated in the appended examples.

The starting compound used in the process of this invention is 16a,17a-oxido-$\Delta^4$-pregnene-21-ol-3,20-dione acetate. It is described by Julian et al. in the Journal of the American Chemical Society, vol. 72, page 5145. As stated above, this starting compound may be subjected to various chemical and/or microbiological reactions of a known nature to produce modifications of the compound which may have an hydroxyl group at the 11-position and/or double bonds at the 1,2- and the 6,7-position.

An essential feature of this invention in the conversion of the hydroxyacetyl group at the 17β-position to a β-carboxyl group, the latter being a characteristic of etiocholenic acids. This may be accomplished directly if no oxygen is present at the 11-position. If an oxygen is present, it must be in the ketonic form as will be described more fully hereinafter.

The conversion of the α-hydroxyacetyl group to a carboxyl group is accomplished using periodic acid. The reaction is carried out by contacting the steroid and the oxidizing agent in a reaction inert solvent or solvent system at a temperature of from about 15° C to about 40° C. for a period of from about five to about twenty hours. In preferred use, the steroid is dissolved in a water miscible organic solvent which is inert to the oxidizing agent and the solution is mixed with a water solution of periodic acid. The reaction mixture is then allowed to stand at from about 15° C. to about 40° S. Suitable organic solvents include water miscible ethers such as dioxane and tetrahydrofuran or water miscible N-alkyl amides or N,N-dialkyl amides such as dimethyl formamide, N-methyl acetamide or N-ethyl acetamide.

While theoretically it is possible to effect the reaction using reaction equivalents of the reagents, in preferred practice an excess of oxidizing agent, even as high as 200% excess is employed so as to insure complete conversion of the steroid.

The product is isolated by pouring the reaction mixture into an excess of water, preferably ice cold water, whereupon it precipitates and may be recovered by filtration.

In the next step of the reaction, the etio acid prepared as above is converted to an acid chloride. This may be accomplished using thionyl chloride, sulfuryl chloride or other known reagents generally used for this purpose. These, however, are not the preferred reagents for the purposes of this process. The reason for this is that each of them produces some hydrogen chloride as by-products of the reaction and this reagent may open the epoxide ring and thus contaminate the desired acid chloride with 16-chloro substituted compounds. It is, therefore, preferred to convert the etio acid first to an alkali metal salt, e.g., the sodium or potassium salt, and to react the salt with oxalyl chloride. The advantage of this procedure is that no hydrogen chloride is formed.

The alkali metal salt is formed by reaction of the etiocholenic acid with an alkali metal carbonate, bicarbonate or hydorxide, preferably in equimolar quantities although an excess, say up to 10% of the base can be used.

One convenient method of carrying out the reaction is to simply dissolve an equivalent of the acid at from about 15° C. to about 30° C. in a dilute aqueous solution of the selected base, for example, 10% sodium bicarbonate and to freeze dry the solution.

Alternatively, the reaction can take place by dissolving equivalents of the acid in a minimum of dilute aqueous base and the water may be removed by distilling off a benzene-water azeotrope to leave the sodium salt suspended in benzene. It is recovered from the benzene by filtration.

The alkali metal salt is next converted to an acid chloride by reaction with oxalyl chloride. The reaction conveniently takes place in an organic solvent which will not dissolve more than a minimum of the sodium chloride by-product but will keep the acid chloride in solution. The solvent selected should, of course, be inert to the reactants. Suitable solvents include aromatic hydrocarbons and halogenated aromatic hydrocarbons such as benzene, toluene, chlorobenzene and bromobenzene. Benzene is the preferred solvent because of its ready availability at relatively low cost. It has the added advantage of forming an azeotrope with water so that the sodium salt may be made completely anhydrous by taking it up in an excess of benzene and distilling off the azeotropic mixture. It is, of course, desirable that the reaction take place under anhydrous conditions so as to minimize side reactions resulting from reaction between the oxalyl chloride and water.

The reaction takes place by adding the oxalyl chloride to a slurry of the sodium salt in the selected solvent at a temperature of from about −10° C. to about 15° C., allowing the mixture to stand for from about one-half hour to about four hours, filtering off the precipitate and recovering the acid chloride by distilling off the solvent, preferably in vacuo. Equimolar quantities of the reactants may be employed, but to insure complete reaction it is preferred to use from about 10% to about 50% excess of the oxalyl chlorides. Depending on the size of the reaction vessel and the temperature at which the reaction is carried out, it may be convenient to add the oxalyl chloride in increments so as to avoid losses due to foaming of the reaction mixture resulting from the formation of gaseous by-products. There is no objection to allowing the reaction mixture to come slowly to room temperature once all of the oxalyl chloride has been added.

The acid chloride may be isolated before going on to the next step, that is the formation of the diazoketone. However, better yields are obtained if it is reacted directly with diazoethane in the solution in which it is prepared. The reaction is effected by treatment of the acid chloride with diazoethane in a reaction inert organic solvent at from about −20° C. to about 15° C. for from about one-half to about four hours. Diazoethane, as is known to those skilled in the art is prepared and used in solution. The usual solution is diethyl ether although higher ethers or other water immiscible solvents such as benzene can be employed. Equimolar quantities of reactants can be used, but in preferred practice from about 50% to about 25% excess of diazoethane is employed.

The product is isolated by removing the solvent and excess diazoethane in vacuo and may be purified by recrystallization from a suitable solvent such as ethyl acetate.

Although the diazoketone can be isolated, in preferred practice it is converted to the chloroketone in the same solvent in which it is prepared. One reason for this is that in the preparation of the diazoketone, especially if 11-desoxy compounds are used, small amounts of the chloroketone are formed. Rather than lose this chloroketone during the course of purification, the whole reaction mixture is treated directly with hydrogen chloride.

The reaction may be effected by simply bubbling hydrogen chloride into the reaction mixture containing both diazoketone and chloroketone, or by bubbling hydrogen chloride into a suspension or solution of purified diazoketone or of a mixture of diazoketone and chloroketone in a liquid medium such as an ether or hydrocarbon containing up to eight carbon atoms. Suitable solvents include benzene, toluene, diethyl ether, di-n-butyl ether, dioxane and tetrahydrofuran. Alternatively, a solution of the hydrogen chloride in one of these same solvents may be added to the steroid in suspension or solution. The reaction takes place at from about −10° C. to about +10° C. and at least an equimolar quantity of hydrogen chloride should be employed. To insure complete reaction, up to 200% excess of mineral acid or even more is preferred.

The chloroketone is next converted to an acyloxy compound by replacement of the chlorine atom with an acyloxy group containing up to five carbon atoms. Basically, this is a reaction with an alkali metal salt, preferably the sodium or potassium salt of an organic acid. It may be carried out in a number of ways.

The first one of these procedures for preparing the acyloxy compound, that is the reaction with an alkali metal salt of a lower organic acid, may be carried out either by direct addition of the salt to a solution of the chloroketone or by in situ formation of the salt in the solution containing the steroid. In either event, the reaction is between the chloroketone and the alkali metal salt, for example, sodium or potassium acetate, propionate, butyrate or valerate, and takes place in a lower aliphatic oxygenated solvent containing up to six carbon atoms including esters such as ethyl acetate or ketones such as acetone, methyl ethyl ketone or di-isopropyl ketone. The reaction takes place at a temperature of from about 40° C. to about 100° C. during a period of from about four to about twenty hours. An excess of salt may be employed to insure complete reaction of the ketone, but this is not essential. Thus a quantity of the salt ranging from equimolar to 200% excess may be successfully used.

In a preferred operation, the alkali metal salt is generated in situ by taking up the chloroketone in acetone containing potassium bicarbonate, adding at least an equimolar portion of acetic acid and refluxing the mixture for from about 10 to about 16 hours. The product may be isolated by removing the solvent in vacuo and washing the residue with a minimum amount of water to remove the inorganic salts. Alternatively, the reaction mixture may be diluted with water and the resulting solution extracted with an organic solvent. Suitable solvents include lower aliphatic and aromatic hydrocarbon and halogen substituted organic solvents containing up to eight carbon atoms such as benzene, toluene, hexane, octane, petroleum ether, chlorobenzene, carbon tetrachloride and chloroform. The product is isolated from the organic solution preferably by removal of the solvent in vacuo. It is desirable although not necessary to dry the organic solution over an anhydrous drying agent such as sodium or magnesium sulfate before evaporating the solvent.

The reaction is sometimes aided by the addition of potassium iodide to the mixture containing the chloroketone and the alkali metal salt. This, however, is not necessary. The amount added when the reagent is employed may vary from about 2% by weight to about 75% by weight of the alkali metal salt utilized.

One advantage of using this procedure in the preparation of valuable 17β-hydroxylated propanoyl compounds is that it is possible to conveniently obtain both possible optical forms of the propanoyl compounds. It is most convenient to separate the isomers at this particular stage of the synthetic process, that is, at the stage where the acyloxy compounds are prepared. This is accomplished most readily by chromatographic procedures. Thus if the acyloxy compounds are adsorbed in a suitable adsorbing agent, preferably on a column, the isomers may be separated by elution with selected solvents. The isomers may then be separately treated to prepare the final compounds. It is, of course, not necessary to separate the isomers in performing the process of this invention.

One method of separating the isomers which has been found to be useful is to dissolve the mixture of acyloxy compounds in benzene and to adsorb the substances on a synthetic silicate adsorbent of the class described in U.S. Patent No. 2,393,625. One form of this class which has been found to be especially suitable is available from the Floridin Company of Tallahassee, Florida, under the trade name Florisil. The separate isomers are eluted from the column with solvents or mixtures of solvents of progressively increasing polarity. The less polar isomer which has been designated the A-isomer is eluted first, and the more polar, the B-isomer, is eluted later in more polar solvents. The compounds are recovered from the eluting solvents by evaporation in vacuo. One specific instance in which benzene, 90% benzene–10% ether, ether, chloroform, 90% chloroform–10% ethyl acetate and ethyl acetate are used successively as the eluting agents appears in the examples of this application.

It is, of course, possible, as will be recognized by those skilled in the art, to use other adsorbents such as neutral alumina and other solvents or solvent systems.

In the next step of this invention, the acyloxy compound either in pure epimeric form or as a mixture of isomers is converted to a 16β-bromo-17α-hydroxy compound, that is, a bromohydrin by opening the epoxide ring with hydrogen bromide.

The bromohydrin is formed by treating the epoxide in a reaction inert organic solvent, preferably a lower aliphatic organic acid such as acetic or butyric acid with hydrogen bromide dissolved in a similar reaction inert solvent. In preferred operations, the steroid is dissolved in acetic acid and the hydrogen bromide is added in the form of a 20% to 32% solution of this reagent in acetic acid.

The reaction is carried out at from about 10° C. to about 30° C., preferably 15° C. to 25° C. The reaction mixture is simply allowed to stand at the selected temperature and the bromohydrin forms. At least a molar equivalent of hydrogen bromide is used and preferably an excess of from about 10% to about 100% is employed.

The product may be isolated from the reaction mixture by evaporating the solvent or by comingling the mixture with cold water. In the event that the solvent is evaporated, it may be helpful to wash the residue with a small amount of ether to induce crystallization. If the water method is used, the product precipitates and is recovered by filtration.

In the last step of the process of this invention, the bromine atom at the 16-position is removed. This may be accomplished by known debrominating agents such as zinc in acetic acid or methanol. It is preferred, however, to use reductive dehalogenation, for example, dehalogenation with Raney nickel.

Suitable solvents for carrying out the reaction with Raney nickel include reaction inert organic solvents such as lower aliphatic oxygenated solvents including ethers, alcohols, acids and ketones containing up to five carbon atoms. Methanol, ethanol, propanoyl, isopropanol, pentanol, acetone, methyl isopropyl ketone, dioxane, acetic acid and propionic acid are examples of suitable solvents. The use of a mixed solvent such as methanol-acetic acid is sometimes advantageous.

The amount of Raney nickel used is not critical although to insure the most economical utilization of the steroid starting material, it is generally preferred to use an excess of this dehalogenating agent. From four to twenty grams of Raney nickel per gram of steroid has been found to provide suitable yields. The preferred excess, as will be recognized by those skilled in the art, will depend upon the degree of activity of the Raney nickel. This, in turn, will depend upon its previous treatment. With Raney nickel which has been washed first with water, then with acetic acid, then with methanol and finally with acetone in accordance with known procedures, it is usually found that from ten to fifteen grams of Raney nickel per gram of steroid give suitable results. However, the Raney nickel can be used without previous treatment or with other known treatments and still function as a dehalogenating agent when employed in accordance with the procedures of this invention.

The duration of the reaction is not critical, and depends only on the degree of activity of the Raney nickel. This degree of activity is readily determined by tests well known to those skilled in the art, and include, for example, the reduction of known compounds requiring varying degrees of reducing activity. Reaction periods as short as five minutes or as long as twenty-four hours can be used. It is, however, preferred to carry out the reaction during a period of from one-half hour to six hours.

For optimum yields, the temperature of the reaction should be controlled so that it does not rise above 30° C. during the reaction period and it is best to carry out the reaction between 0° C. and 15° C.

Although it is not essential, it is preferred to carry out the reaction in an inert atmosphere such as a nitrogen atmosphere. This assures the most efficient use of the Raney nickel by minimizing its reaction with atmospheric oxygen.

As shown above, the process of this reaction can be applied to 11-desoxy compounds or compounds having an oxygen atom at the 11-position. If the latter type of compound is employed, the oxygen should be in the ketonic form once the etio acid is prepared. The oxygen is introduced initially as either an 11α- or an 11β-hydroxyl group using a suitable microorganism and may be converted to a ketonic oxygen by any of a number of agents known to those skilled in the art for carrying out this oxidation reaction. Useful reagents include, for example, chromium trioxide, sodium dichromate, chromic acid-pyridine complex, N-chloro acetamide and aluminum isopropoxide or aluminum t-butoxide in the presence of a hydrogen acceptor such as acetone or cyclohexanone. The latter reaction may be carried out in an inert organic solvent such as benzene, toluene or xylene. The use of certain of these reagents is shown in the examples.

If 11-oxygenated compounds are employed in the course of this valuable synthetic sequence, 11-keto-21-acyloxy compounds are obtained as final products. These are therapeutically active, but for most purposes, it is preferred to convert them to 11β-hydroxyl compounds since these hydroxylated compounds have therapeutic advantages well known to those skilled in the art. A number of reagents are available for this purpose. The preferred reducing agents are alkali metal hydrides such as lithium aluminum hydride and sodium borohydride. Of these, the latter is preferred since the hydroxyl group in the compound produced has predominantly the β-configuration. However, if lithium aluminum hydride is used, there are well-known means of separating the isomers.

Before reducing the 11-keto group, it is necessary to protect the ketone group at the 3- and the 20-positions. This is accomplished using an alkylene dioxy compound such as ethylene glycol or propylene glycol to form a diketal. The reaction takes place by treating the steroid compound with, for example, a 10% to 50% excess of ethylene glycol in a solvent such as benzene which forms an azeotrope with water. A small amount, say from 0.1% to 1% of p-toluene sulfonic acid is added to the mixture and the whole is refluxed for from 5 to 20 hours. At the end of this time, the mixture is washed with an alkaline reagent such as 5% aqueous sodium bicarbonate, the mixture extracted with ether or other organic solvent and the product recovered by evaporation of the solvent. It may be desirable to dry the solvent over an anhydrous drying agent such as sodium sulfate before removing the solvent.

It should be noted that before the diketal is produced, the acyloxy group should be removed. This provides for increased yields of diketal since the bulky acyloxy group may prevent the ketalization of the 20-carbonyl group. The acyloxy group is converted to an hydroxyl group by the usual hydrolysis reaction, that is, dilute acid or base, for example, 10% aqueous methanol containing an equivalent of hydrochloric acid or potassium bicarbonate.

The reaction with sodium borohydride is carried out in a reaction inert organic solvent such as the lower alkanols, lower alkyl amines or pyridine at a temperature of from about −40° C. to about 25° C. for a period of from about 2½ to about 8 hours. Although in theory, an equimolar portion of borohydride can be used, it is preferred to use an excess of the reducing agent, say for example, up to a 200% excess so as to insure complete reduction of the starting material. Excess reducing agent is decomposed by the addition of water or dilute acid at the end of the reaction period. The desired product may be recovered after filtration by evaporating the solvent in vacuo or preferably by extraction with an organic solvent such as chloroform. The extraction solvent is washed with dilute base, such as 5% aqueous sodium bicarbonate and with water. After drying, for example, over anhydrous sodium or magnesium sulfate, the organic solution is filtered and the solvent removed in vacuo.

After the reduction, the ketal groups are removed by acid hydrolysis using, for example, dilute aqueous hydrobromic, hydrochloric or sulfuric acid. The product is recovered by extraction from the aqueous mixture using a water immiscible organic solvent by the procedure described above in connection with the isolation of the product obtained by hydrolysis of the acyloxy compound.

The borohydride reduction is not essential to the process of this invention, since as indicated above, the hydroxyl group may be introduced by microbiological means using as a substrate, one of the later products of the invention such as the 17α-hydroxy compound obtained from the reductive dehalogenation of the bromohydrin.

A number of new and useful compounds are prepared using the process of this invention. They are useful intermediates since they can be used to prepare valuable therapeutically active compounds. These include compounds having the formulas:

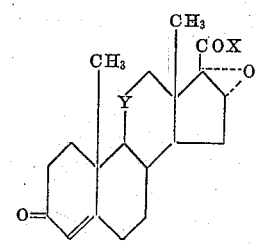

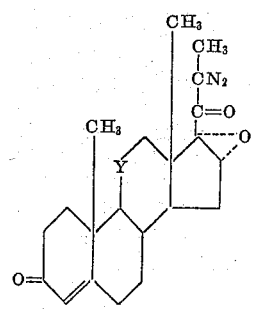

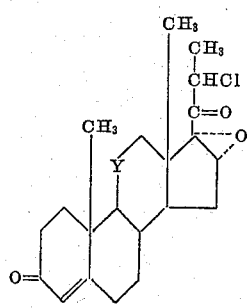

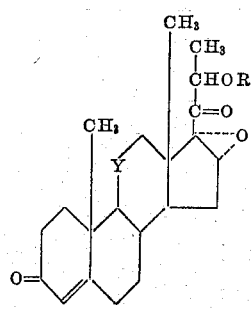

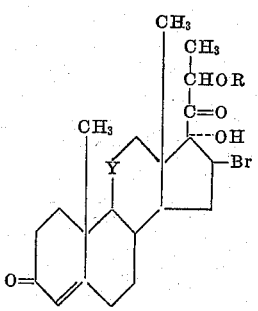

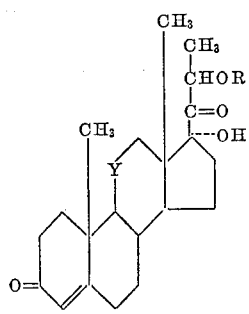

and the $\Delta^1$-, $\Delta^6$- and $\Delta^{1,6}$-dehydro derivatives of these wherein Y is selected from the group consisting of

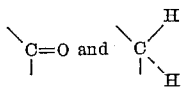

X is selected from the group consisting of chlorine, hydroxyl, O-sodium and O-potassium, that is, OK and ONa and R is selected from the group consisting of acyl groups containing only carbon, hydrogen and oxygen up to a total of five carbon atoms.

The following examples are given solely for the purpose of illustration and are not to be construed as limitations of this invention, many apparent variations of which are possible without departing from the spirit or scope thereof.

EXAMPLE I

*$16\alpha,17\alpha$-Oxido-$\Delta^{1,4}$-Pregnadiene-$11\alpha,17\alpha,21$-Triol-$3,20$-Dione*

The compound, $16\alpha,17\alpha$-oxido-$\Delta^4$-pregnene-$11\alpha,17\alpha,21$-triol-$3,20$-dione was prepared from the 11-desoxy compound [Julian et al., JACS 72, 5145 (1954)] by microbiological hydroxylation using Peterson's procedure [JACS 74, 5933 (1952)] and was acetylated at the 21-position using acetic anhydride and pyridine according to standard procedures. A mixture of 0.8 g. of the product thus prepared, 0.8 g. of selenium dioxide (freshly sublimed) and 10 ml. of t-butyl alcohol was heated in a nitrogen atmosphere for ten and one-half hours at 175° C. The solution was filtered and the 21-acetate of the desired product precipitated by the addition of water. It was isolated by filtration and hydrolyzed using an equivalent of potassium carbonate in 10% aqueous methanol solution.

EXAMPLE II

*$16\alpha,17\alpha$-Oxido-$\Delta^{1,4}$-Pregnadiene-$11\beta,17\alpha,21$-Triol-$3,20$-Dione*

The procedure of Example I was repeated except that the hydroxyl group at the 11-position was introduced in the $\beta$-modification using *Curvularia lunata* in accordance with the procedure described in U.S. Patent 2,658,023.

EXAMPLE III

*$16\alpha,17\alpha$-Oxido-$\Delta^{4,6}$-Pregnadiene-$11\alpha,17\alpha,21$-Triol-$3,20$-Dione and $16\alpha,17\alpha$-Oxido-$\Delta^{4,6}$-Pregnadiene-$11\beta,17\alpha,21$-Triol-$3,20$-Dione*

Each of the compounds prepared in Examples I and II (1.3 g.) was separately refluxed in a nitrogen atmosphere for 18 hours in 30 ml. of t-butyl alcohol containing 3.0 g. of chloranil. Each mixture was separately diluted with 250 ml. of chloroform and washed with three successive small portions of 5% aqueous sodium hydroxide and then three times with water. Each organic layer was dried over anhydrous sodium sulfate, filtered and concentrated in vacuo to leave the desired products as residues.

EXAMPLE IV

*$16\alpha,17\alpha$-Oxido-$\Delta^{1,4,6}$-Pregnatriene-$11\alpha,17\alpha,21$-Triol-$3,20$-Dione and $16\alpha,17\alpha$-Oxido-$\Delta^{1,4,6}$-Pregnatriene-$11\beta,17\alpha,21$-Triol-$3,20$-Dione*

The selenium dioxide dehydrogenation described in Example I was repeated on each of the products of Example IV. The compounds of Example IV were first acetylated at the 21-position and then hydrolyzed after reaction with selenium dioxide. Each of these reactions was in accordance with standard procedures.

EXAMPLE V

*$11\alpha$-Hydroxy-$16\alpha,17\alpha$-Oxido-$3$-Keto-$\Delta^4$-Etiocholenic Acid*

A solution was prepared containing 20 g. of $16\alpha,17\alpha$-oxido-$\Delta^4$-pregnene-$11\alpha,21$-diol-$3,20$-dione in 400 ml. of dioxane at 40° C. To this mixture, there was added a molar equivalent of periodic acid in 400 ml. of water and the resulting mixture was allowed to stand at 40° C. for five hours. At the end of this period, the mixture was stirred into 1600 ml. of water at approximately 5° C. and stirred for 30 minutes. The desired product precipitated and was recovered by filtration. It was purified by recrystallization from ethanol: M.P. 216–217° C. (d.), $\lambda_{max}=242$ m$\mu$, $\epsilon=15,600$.

The procedure was repeated to prepare: $11\beta$-hydroxy-$16\alpha,17\alpha$-oxido-$3$-keto-$\Delta^4$-etiocholenic acid.

EXAMPLE VI

*$11\alpha$-Hydroxy-$16\alpha,17\alpha$-Oxido-$3$-Keto-$\Delta^{1,4}$-Etiocholadienic Acid*

A solution was prepared containing 20 g. of $16\alpha,17\alpha$-oxido-$\Delta^{1,4}$-pregnadiene-$11\alpha,21$-diol-$3,20$-dione in 400 ml. of tetrahydrofuran at 15° C. To this mixture, there was added a 200% molar excess of periodic acid in 400 ml. of water and the resulting mixture was allowed to stand at 15° C. for twenty hours. The product was recovered by pouring in ice cold water as described in Example V.

The procedure was repeated to prepare $11\beta$-hydroxy-$16\alpha,17\alpha$-oxido-$\Delta^{1,4}$-etiocholadienic acid.

EXAMPLE VII

*$11\alpha$-Hydroxy-$16\alpha,17\alpha$-Oxido-$3$-Keto-$\Delta^{1,4,6}$-Etiocholatrienic Acid*

A solution was prepared containing 20 g. of $16\alpha,17\alpha$-oxido-$\Delta^{1,4,6}$-pregnatriene-$11\alpha,21$-diol-$3,20$-dione in 400 ml. of dimethyl formamide at 15° C. To this mixture, there was added a 200% molar excess of periodic acid in 400 ml. of water and the resulting mixture was allowed to stand at 15° C. for twenty hours. The product was recovered by pouring in ice cold water as described in Example V.

The procedure was repeated to prepare $11\beta$-hydroxy-$16\alpha,17\alpha$-oxido-$\Delta^{1,4,6}$-etiocholatrienic acid.

EXAMPLE VIII

*$16\alpha,17\alpha$-Oxido-$3$-Keto-$\Delta^4$-Etiocholenic Acid*

A solution was prepared containing 20 g. of $16\alpha,17\alpha$-oxido-$\Delta^4$-pregnene-$21$-ol-$3,20$-dione in 400 ml. of dioxane at 25° C. To this mixture, there was added a 200% molar excess of periodic acid in 400 ml. of water and the resulting mixture was allowed to stand at 25° C. for fifteen hours. The product was recovered by pouring in ice cold water as described in Example V.

The procedure was repeated to prepare the following compounds:
(1) $16\alpha,17\alpha$-oxide-$3$-keto-$\Delta^{1,4}$-etiocholadienic acid
(2) $16\alpha,17\alpha$-oxide-$3$-keto-$\Delta^{1,4,6}$-etiocholatrienic acid

EXAMPLE IX

*$16\alpha,17\alpha$-Oxido-$3,11$-Diketo-$\Delta^4$-Etiocholenic Acid*

A solution was prepared containing 10 g. of $11\alpha$-hydroxy-$16\alpha,17\alpha$-oxido-$3$-keto-$\Delta^4$-etiocholenic acid in 500 ml. of glacial acetic acid. To this solution, there was added dropwise with stirring over a period of 40 minutes, 100 ml. of an acetic acid containing 1.1 equivalents of chromium trioxide. The mixture was stirred at 25° C. for an additional hour. The resulting solution was added to 1800 ml. of water at 0° C. and filtered. The filtrate was extracted three times with 250 ml. portions of chloroform and the chloroform extract washed twice with equal volumes of water, dried over anhydrous sodium sulfate, filtered and the desired product recovered by evaporation of the solvent in vacuo. For purification, the residue was taken up in dilute sodium hydroxide and precipitated by the addition of dilute hydrochloric acid. The product was recovered by filtratoin: M.P. 225–226° C., $\lambda_{max}=238$ m$\mu$, $\epsilon=15,600$.

The procedure was repeated using the 11$\beta$-hydroxy compound to prepare the same product.

EXAMPLE X

*16$\alpha$,17$\alpha$-Oxido-3,11-Diketo-$\Delta^{1,4}$-Etiocholadienic Acid*

Chromic anhydride (0.125 g.) was added to 15 ml. of pyridine at 5° C. and the mixture allowed to warm spontaneously to room temperature. To this solution was added 2.5 g. of 11$\alpha$-hydroxy-16$\alpha$,17$\alpha$-oxido-$\Delta^{1,4}$-etiocholadienic acid and the mixture was allowed to stand at approximately 25° C. for twenty-four hours. The solution was extracted with ether and the ether solution washed twice with 5% aqueous hydrochloric acid and then with water. The ether layer was dried over anhydrous sodium sulfate, filtered and the product recovered by evaporation of the solvent in vacuo.

The procedure was repeated using the 11$\beta$-hydroxy compound to prepare the same product.

EXAMPLE XI

*16$\alpha$,17$\alpha$-Oxido-3,11-Diketo-$\Delta^{1,4,6}$-Etiocholatrienic Acid*

A solution of 0.5 g. of sodium dichromate dihydrate in 10 ml. of glacial acetic acid was added over a thirty-minute period to 0.25 g. of 11$\alpha$-hydroxy-16$\alpha$,17$\alpha$-oxido-$\Delta^{1,4,6}$-etiocholatrienic acid in 50 ml. of 1:1 glacial acetic acid-benzene at 10° C. After one hour, an additional 0.3 g. of oxidizing agent in 7 ml. of solvent was added and the mixture left standing for twenty-four hours at 10° C. The mixture was poured into cold 5% aqueous sodium bisulfite solution and the solution extracted with ether. The ether solution was washed with water until the washings were neutral. The solution was dried over anhydrous sodium sulfate, filtered and the ether removed in vacuo to isolate the desired product.

The procedure was repeated using the 11$\beta$-hydroxy compound to prepare the same product.

EXAMPLE XII

*Preparation of Sodium Salts*

Sodium salts of each of the compounds prepared in Examples VIII, IX, X and XI were synthesized by the addition of 42.5 ml. of 1.3 N aqueous sodium hydroxide to 20 grams of the product in 140 ml. of water. The resulting mixture was filtered and the filtrate freeze dried to give the desired product. The compounds prepared were:

(1) Sodium-16$\alpha$,17$\alpha$-oxido-3-keto-$\Delta^4$-etiocholenate
(2) Sodium-16$\alpha$,17$\alpha$-oxido-3-keto-$\Delta^{1,4}$-etiocholadienate
(3) Sodium-16$\alpha$,17$\alpha$-oxido-3-keto-$\Delta^{1,4,6}$-etiocholatrienate
(4) Sodium-16$\alpha$,17$\alpha$-oxido-3,11-diketo-$\Delta^4$-etiocholenate
(5) Sodium - 16$\alpha$,17$\alpha$ - oxido - 3,11 - diketo - $\Delta^{1,4}$ - etiocholadienate
(6) Sodium - 16$\alpha$,17$\alpha$ - oxido - 3,11 - diketo - $\Delta^{1,4,6}$ - etiocholatrienate

EXAMPLE XIII

*Preparation of Potassium Salts*

Potassium salts of each of the compounds prepared in Examples VIII, IX, X and XI were synthesized by the addition of an equimolar portion of potassium bicarbonate in 10% aqueous solution to 20 grams of the free acid in 600 ml. of benzene. The mixture was allowed to stand at 15° C. for two hours and the water removed by azeotropic distillation. The desired product was recovered by filtration from the resulting benzene suspension. The compounds prepared were:

(1) Potassium-16$\alpha$,17$\alpha$-oxido-3-keto-$\Delta^4$-etiocholenate
(2) Potassium-16$\alpha$,17$\alpha$-oxido-3-keto-$\Delta^{1,4}$-etiocholadienate
(3) Potassium - 16$\alpha$,17$\alpha$ - oxido - 3 - keto - $\Delta^{1,4,6}$ - etiocholenate
(4) Potassium - 16$\alpha$,17$\alpha$-oxido - 3,11 - diketo - $\Delta^4$ - etiocholadienate
(5) Potassium - 16$\alpha$,17$\alpha$ - oxido - 3,11 - diketo - $\Delta^{1,4}$ - etiocholadienate
(6) Potassium - 16$\alpha$,17$\alpha$ - oxido - 3,11 - diketo - $\Delta^{1,4,6}$-etiocholatrienate

EXAMPLE XIV

*Sodium Salt of 16$\alpha$,17$\alpha$-Oxido-3,11-Diketo-$\Delta^4$-Etiocholenic Acid*

The procedure of Example XIII was repeated using an equivalent of 5% aqueous sodium carbonate with 16$\alpha$,17$\alpha$-oxido-3,11-diketo-$\Delta^4$-etiocholenic acid in 600 ml. of benzene. The mixture was allowed to stand at 30° C. for ten hours and recovered by filtration after azeotropic removal of the water.

EXAMPLE XV

*16$\alpha$,17$\alpha$-Oxido-3,11-Diketo-$\Delta^4$-Etiocholenyl Chloride*

Sodium 16$\alpha$,17$\alpha$ - oxido - 3,11 - diketo - $\Delta^4$ - etiocholenate (21.8 g.) was taken up in 600 ml. of benzene and dried by azeotropic distillation of 200 ml. of the benzene and water azeotrope at atmospheric pressure. The resultitng slurry was maintained at approximately 5° C. while 40 ml. of oxalyl chloride was added in two 20 ml. portions. The second portion was not added until the foaming resulting from the first addition had subsided. The mixture after the second addition was maintained at approximately 5° C. and stirring was continued for another 30 minutes while the temperature was permitted to slowly increase. The mixture was clarified by filtration and the filtrate evaporated in vacuo. The residue was dried to remove the benzene and taken up in 1.3 N sodium hydroxide, filtered and the filtrate adjusted to pH 2.0 with 3 N hydrochloric acid. The desired product precipitated and was recovered by filtration.

Other compounds prepared by this procedure include:

(1) 16$\alpha$,17$\alpha$-oxido-3,11-diketo-$\Delta^4$-etiocholenyl chloride
(2) 16$\alpha$,17$\alpha$ - oxido - 3,11 - diketo - $\Delta^{1,4}$ - etiocholadienyl chloride
(3) 16$\alpha$,17$\alpha$-oxido-3,11-diketo-$\Delta^{1,4,6}$-etiocholatrienyl chloride

EXAMPLE XVI

*16$\alpha$,17$\alpha$-Oxido-3,11-Diketo-$\Delta^{1,4}$-Etiocholadienyl Chloride*

A slurry of 20 g. of potassium 16$\alpha$,17$\alpha$-oxido-3,11-diketo-$\Delta^{1,4}$-etiocholenate in 400 ml. of chlorobenzene was prepared and a 10% excess of oxalyl chloride was added in three equal portions while maintaining the temperature at $-10$° C. The mixture was allowed to stand at this temperature for four hours and the product was isolated by distilling off the solvent and excess oxalyl chloride in vacuo.

EXAMPLE XVII

*16$\alpha$,17$\alpha$-Oxido-3,11-Diketo-$\Delta^{1,4,6}$-Etiocholatrienyl Chloride*

A slurry of 20 g. of potassium 16$\alpha$,17$\alpha$-oxido-3,11-diketo-$\Delta^{1,4}$-etiocholenate in 400 ml. of toluene was prepared and a 200% excess of oxalyl chloride was added in three equal portions while maintaining the temperature at 15° C. The mixture was allowed to stand at this temperature for one-half hour and the product was isolated by distilling off the solvent and excess oxalyl chloride in vacuo.

Other compounds prepared by this procedure include:

(1) 16$\alpha$,17$\alpha$-oxido-3-keto-$\Delta^4$-etiocholenyl chloride
(2) 16$\alpha$,17$\alpha$-oxido-3-keto-$\Delta^{1,4}$-etiocholadienyl chloride
(3) 16$\alpha$,17$\alpha$-oxido-3-keto-$\Delta^{1,4,6}$-etiocholatrienyl chloride

EXAMPLE XVIII

*21-Methyl-21-Diazo-16α,17α-Oxido-Δ⁴-Pregnene-3,11,20-Trione*

To a solution containing 20 g. of 16α,17α-oxido-3,11-diketo-Δ⁴-etiocholenyl chloride in 400 ml. of benzene prepared in accordance with the procedure of Example XV but without isolation of the product, there was added an equimolar quantity of diazoethane in 600 ml. of ether and the resulting mixture was maintained at 15° C. for one-half hour. The solvent was removed in vacuo to leave the desired product as a residue.

EXAMPLE XIX

*21-Methyl-21-Diazo-16α,17α-Oxido-Δ¹,⁴-Pregnadiene-3,11,20-Trione*

A solution was prepared containing 20 g. of 16α,17α-oxido-3,11-diketo-Δ¹,⁴-etiocholadienyl chloride in 400 ml. of di-n-butyl ether and a 200% excess of diazoethane in 400 ml. of di-n-butyl ether was added at −20° C. The mixture was maintained at this temperature for four hours and the product isolated by distillation in vacuo.

Other compounds prepared according to this procedure include:

(1) 21 - methyl - 21 - diazo - 16α,17α - oxido - Δ¹,⁴,⁶ - pregnatriene-3,11,20-trione
(2) 21 - methyl - 21 - diazo - 16α,17α - oxido - Δ⁴ - pregnene-3,20-dione
(3) 21 - methyl - 21 - diazo - 16α,17α - oxido - Δ¹,⁴ - pregnadiene-3,20-dione
(4) 21 - methyl - 21 - diazo - 16α,17α - oxido - Δ¹,⁴,⁶-pregnatriene-3,20-dione

EXAMPLE XX

*21-Methyl-21-Chloro-16α,17α-Oxido-Δ⁴-Pregnene-3,11,20-Trione*

A benzene solution containing 20 g. of 16α,17α-oxido-3,11-diketo-Δ⁴-etiocholenyl chloride was mixed with an excess of diazoethane in 600 ml. of ether prepared in accordance with the standard procedures and the mixture was stirred for one hour at from −15° C. to −10° C. At the end of this period, 400 ml. of an ethereal solution containing 15 grams of hydrogen chloride was added at −5° C. and the mixture stirred for approximately 5 minutes. The solution was extracted three times with equal volumes of ice cold water, once with an equal volume of 5% aqueous sodium bicarbonate and again with an equal volume of water. The organic solution was dried over anhydrous sodium sulfate, filtered and the desired product recovered by removal of the solvent in vacuo.

Other compounds prepared by this procedure include:

(1) 21-methyl-21-chloro-16α,17α-oxido-Δ¹,⁴-pregnadiene-3,11,20-trione
(2) 21 - methyl-21-chloro-16α,17α-oxido-Δ¹,⁴,⁶-pregnatriene-3,11,20-trione
(3) 21-methyl-21-chloro-16α,17α-oxido-Δ⁴-pregnene-3,20-dione
(4) 21-methyl-21-chloro-16α,17α-oxido-Δ¹,⁴-pregnadiene-3,20-dione
(5) 21 - methyl-21-chloro-16α,17α-oxido-Δ¹,⁴,⁶-pregnatriene-3,20-dione

EXAMPLE XXI

*21-Methyl-21-Chloro-16α,17α-Oxido-Δ⁴-Pregnene-3,11,20-Trione*

An equimolar quantity of hydrogen chloride was bubbled into a solution containing 20 g. of 21-methyl-21-diazo-16α,17α-oxido-Δ⁴-pregnene-3,11,20-trione in 400 ml. of benzene at −10° C. and the solution maintained at this temperature for 10 minutes. The solution was extracted with an equal portion of water, washed with an equal portion of 5% aqueous potassium carbonate and again with an equal volume of water. The organic layer was dried over anhydrous sodium sulfate, filtered and the desired product isolated by distillation of the product in vacuo.

EXAMPLE XXII

*21-Methyl-21-Chloro-16α,17α-Oxido-Δ¹,⁴-Pregnadiene-3,11,20-Trione*

An equimolar quantity of hydrogen chloride was bubbled into a solution containing 20 g. of 21-methyl-21-diazo-16α,17α-oxido-Δ¹,⁴-pregnadiene-3,11,20-trione in 400 ml. of tetrahydrofuran at +10° C. and the solution maintained at this temperature for 3 minutes. The solution was extracted with an equal portion of water, washed with an equal portion of 5% aqueous potassium carbonate and again with an equal volume of water. The organic layer was dried over anhydrous sodium sulfate, filtered and the desired product isolated by distillation of the product in vacuo.

EXAMPLE XXIII

*21-Methyl-16α,17α-Oxido-Δ⁴-Pregnene-3,11,20-Trione 21-Acetate (a Mixture of Diasterioisomers)*

A total of 7.236 g. of 21-methyl-21-chloro-16α,17α-oxido-Δ⁴-pregnene-3,11,20-trione was taken up in 3.66 liters of acetone and to this mixture there was added 10.35 grams of potassium bicarbonate. The mixture was then heated to approximately 50° C. and 6.15 ml. of glacial acetic acid was added. It was refluxed for 10 minutes and 5.15 grams of potassium iodide was added. The mixture was then refluxed for 16 hours and concentrated to a volume of approximately 100 ml. in vacuo. To the concentrate, there was added 300 ml. of water and the resulting solution extracted three times with 300 ml. portions of chloroform. The combined chloroform extracts were washed successively with a 200 ml. portion of water, a 200 ml. portion of 5% aqueous sodium bicarbonate and an additional 200 ml. portion of water. The chloroform solution was evaporated to dryness in vacuo.

Other compounds prepared using this procedure include:

(1) 21 - methyl-16α,17α-oxido-Δ¹,⁴-pregnadiene-3,11,20-trione 21-acetate
(2) 21-methyl-16α,17α-oxido-Δ¹,⁴,⁶-pregnatriene-3,11,20-trione 21-acetate
(3) 21-methyl-16α,17α-oxido-Δ⁴-pregnene-3,11-dione 21-acetate
(4) 21-methyl-16α,17α-oxido-Δ¹,⁴-pregnadiene-3,11-dione 21-acetate
(5) 21-methyl-16α,17α-oxido-Δ¹,⁴,⁶-pregnatriene-3,11-dione 21-acetate The corresponding propionates, butyrates, valerates and formates were similarly prepared. All products were obtained as mixtures of diasterioisomers and separated as described in the following example.

EXAMPLE XXIV

*Separation of Diasterioisomers*

A total of 18.39 grams of the diasterioisometric mixture of 21 - methyl-16α,17α-oxido-Δ⁴-pregnene-3,11,20-trione 21-acetate prepared in accordance with the procedure described in the previous example was taken up in benzene and placed on a Florisil column which formed a 20 inch bed of 2 inches diameter. The column was eluted with 4 liters of benzene (fraction 1), 5 liters of 90% benzene-10% ether (fraction 2), 2.5 liters of ether (fraction 3), 1.5 liters of chloroform (fraction 4), 3.0 liters of 90% chloroform-10% ethyl acetate (fraction 5), and 2 liters of ethyl acetate (fraction 6). Each of the fractions was separately concentrated to dryness in vacuo and the residue purified by triturating with ether. The A-isomer was found predominantly in fractions 1 and 2. The B-isomer was found predominantly in fractions 5 and 6.

PHYSICAL CONSTANTS

I. 21 - methyl-16α,17α-epoxy-Δ⁴-pregnene-3,11,20-trione 21-acetate:

A-isomer—
M.P.=173–174° C.
$[\alpha]_D^{24}=+180.1$ (diox.)
$\lambda_{max}=237.5$ mμ.
$\epsilon=15,700$.

Analysis.—Calcd. for $C_{24}H_{30}O_6$: C, 69.54; H, 7.30. Found: C, 69.09; H, 7.22.

II. 21 - methyl-16α,17α-epoxy-Δ⁴-pregnene-3,11,20-trione 21-acetate:

B-isomer—
M.P.=204–205° C.
$[\alpha]_D^{24}=+171.5$ (diox.).
$\lambda_{max}=237.5$ mμ.
$\epsilon=15,800$.

Analysis.—Calcd. for $C_{24}H_{30}O_6$: C, 69.54; H, 7.30. Found: C, 69.96; H, 35.

The diasterioisomers of the previous example were all separated using this procedure.

EXAMPLE XXV

*21-Methyl-16α,17α-Oxido-Δ⁴-Pregnene-3,11,20-Trione 21-Propionate*

A solution containing 20 g. of 21-methyl-21-chloro-16α,17α-oxido-Δ⁴-pregnene-3,11,20-trione in 200 ml. of acetone was prepared and an equimolar quantity of potassium propionate was added. The mixture was maintained at 100° C. for four hours, and the solvent removed in vacuo. The residue was washed with water, filtered and dried to yield the desired product.

EXAMPLE XXVI

*21-Methyl-16α,17α-Oxido-Δ¹,⁴-Pregnadiene-3,11,20-Trione 21-Valerate*

A solution containing 20 g. of 21-methyl-21-chloro-16α,17α-oxido-Δ¹,⁴-pregnadiene-3,11,20-trione in 200 ml. of ethyl acetate was prepared and a 200% molar excess of sodium valerate was added. The mixture was maintained at 40° C. for twenty hours and the solvent removed in vacuo. The residue was washed with water, filtered and dried to yield the desired product.

EXAMPLE XXVII

*16β-Bromo-21-Methyl-Δ⁴-Pregnene-17α,21-Diol-3,11,20-Trione 21-Acetate*

To a suspension containing 3.05 grams of the A-isomer of 21-methyl-16α,17α-oxido-Δ⁴-pregnene - 3,11,20 - trione 21-acetate in 23 ml. of glacial acetic acid there was added 7.6 ml. of 30% hydrogen bromide solution in glacial acetic acid. The solution was allowed to stand at 25° C. for one hour. To this solution at 0° C., there was added 300 ml. of water. The desired product precipitated and was recovered by filtration.

Each of the isomers was subjected to the foregoing treatment.

PHYSICAL CONSTANTS

I. 16β-bromo - 21 - methyl-Δ⁴-pregnene-17α,21-diol-3,11,20-trione 21-acetate:

A-isomer—
M.P.=186–187° C. (d.).
$[\alpha]_D^{24}=+167.9$ (diox.).
$\lambda_{max}=238$ mμ.
$\epsilon=15,800$.

Analysis.—Calcd. for $C_{24}H_{31}O_6Br$: C, 58.18; H, 6.31; Br, 16.13. Found: C, 58.30; H, 6.36; Br, 16.32.

II. 16β-bromo - 21 - methyl-Δ⁴-pregnene-17α,21-diol-3,11,20-trione 21-acetate:

B-isomer—
M.P.=222–223° C. (d.).
$[\alpha]_D^{24}=+132.1$ (diox.).
$\lambda_{max}=238$ mμ.
$\epsilon=15,900$.

Analysis.—Calcd. for $C_{24}H_{31}O_6Br$: C, 58.18; H, 6.31; Br, 16.13. Found: C, 58.48; H, 6.34; Br, 16.23.

Both the A- and B-isomers of the formates, acetates, propionates, butyrates and valerates of the following compounds were prepared using the foregoing procedures.

(1) 16β-bromo-21-methyl-Δ¹,⁴-pregnadiene-17α,21-diol-3,11,20-trione
(2) 16β-bromo-21-methyl-Δ¹,⁴,⁶-pregnatriene-17α,21-diol-3,11,20-trione
(3) 16β-bromo-Δ⁴-pregnene-17α,21-diol-3,11,20-trione
(4) 16β-bromo-Δ⁴-pregnene-17α,21-diol-3,20-dione
(5) 16β-bromo-Δ¹,⁴-pregnadiene-17α,21-diol-3,20-dione
(6) 16β-bromo-Δ¹,⁴,⁶-pregnatriene-17α,21-diol-3,20-dione

EXAMPLE XXVIII

*16β-Bromo-21-Methyl-Δ⁴-Pregnene-17α,21-Diol-3,11,20-Trione 21-Propionate*

A solution containing 20 g. of 21-methyl-16α,17α-oxido-Δ⁴-pregnene-3,11,20-trione 21-propionate in 200 ml. of propionic acid was prepared and a molar equivalent of hydrogen bromide in 30% propionic acid solution was added. The solution was maintained at 10° C. for four hours and then stirred into one liter of water at 5° C. The product precipitated and was recovered by filtration.

Both the A- and the B-isomers were similarly prepared.

EXAMPLE XXIX

*16β-Bromo-21-Methyl-Δ⁴-Pregnene-17α,21-diol-3,11,20-Trione 21-Acetate*

A solution containing 20 g. of 21-methyl-16α,17α-oxido-Δ⁴-pregnene-3,11,20-trione 21-acetate in 200 ml. of glacial acetic acid was prepared. To this solution there was added a 100% molar excess of hydrogen bromide in 20% glacial acetic acid solution. The mixture was maintained at 30° C. for one-half hour and the solvent removed in vacuo. The residue was washed with ether and filtered to yield the desired product as a crystalline residue.

Both the A- and B-isomer were similarly prepared.

EXAMPLE XXX

*21-Methyl-Δ⁴-Pregnene-17α-21-Diol-3,11,20-Trione 21-Acetate*

A mixture containing one gram of 16β-bromo-21-methyl-Δ⁴-pregnene-17α,21-diol-3,11,20-trione 21-acetate and 10 grams of Raney nickel in 140 ml. of methanol was stirred in a nitrogen atmosphere at 25° C. for 4 hours. The mixture was filtered and concentrated to dryness. The residue was taken up in 50 ml. of chloroform and the chloroform solution washed twice with 30 ml. portions of water. The organic layer was separated, dried over anhydrous sodium sulfate, filtered and concentrated to dryness. The residue triturated with a mixture of ethyl acetate and ether, filtered and dried.

Each of the isomers was subjected to the foregoing treatment.

PHYSICAL CONSTANTS

I. 21-methyl-Δ⁴-pregnene-17α,21-diol - 3,11,20 - trione 21-acetate:

A-isomer—
M.P.=179–180° C.
$[\alpha]_D^{24}=+169.1$ (diox.).
$\lambda_{max}=238$ mμ.
$\epsilon=15,400$.

Analysis.—Calcd. for $C_{24}H_{32}O_6$: C, 69.21; H, 7.75. Found: C, 68.86; H, 7.75.

II. 21-methyl-Δ⁴-pregnene-17α,21-diol-3,11,20-trione 21-acetate:

B-isomer—
M.P.=173–175° C.

19

$[\alpha]_D^{24} = +170.1$ (diox.).
$\lambda_{max} = 238 m\mu$.
$\epsilon = 14,600$.

Analysis.—Calcd. for $C_{24}H_{36}O_6$: C, 69.21; H, 7.75. Found: C, 69.17; H, 7.85.

The A- and the B-isomers of the formates, acetates, propionates, butyrates and valerates of the following compounds were similarly prepared:

(1) 21-methyl-$\Delta^4$-pregnene-17$\alpha$,21-diol-3,11,20-trione
(2) 21-methyl-$\Delta^{1,4}$-pregnadiene-17$\alpha$,21-diol-3,11,20-trione
(3) 21-methyl-$\Delta^{1,4,6}$-pregnatriene-17$\alpha$,21-diol-3,11,20-trione
(4) 21-methyl-$\Delta^4$-pregnene-17$\alpha$,21-diol-3,20-dione
(5) 21-methyl-$\Delta^{1,4}$-pregnadiene-17$\alpha$,21-diol-3,20-dione
(6) 21-methyl-$\Delta^{1,4,6}$-pregnatriene-17$\alpha$,21-diol-3,20-dione

EXAMPLE XXXI

21-Methyl-$\Delta^{1,4}$-Pregnadiene-17$\alpha$,21-Diol-3,20-Dione 21-Acetate

A mixture containing 4 g. of 16$\beta$-bromo-21-methyl-$\Delta^{1,4}$-pregnadiene-17$\alpha$,21-diol-3,20-dione 21-acetate and 60 g. of Raney nickel in 300 ml. of propanol was stirred at 0° C. for six hours. The mixture was filtered and concentrated to dryness. The desired compound was isolated and purified in accordance with the procedure of the previous example.

Both the A- and the B-isomers were similarly prepared.

EXAMPLE XXXII

21-Methyl-$\Delta^{1,4,6}$-Pregnatriene-17$\alpha$,21-Diol-3,20-Dione 21-Acetate A mixture containing 4 g. of 16$\beta$-bromo-21-methyl-$\Delta^{1,4,6}$-pregnatriene-17$\alpha$,21-diol-3,20-dione 21-acetate and 40 g. of Raney nickel in 300 ml. of ethanol was stirred at 30° C. for one-half hour. The mixture was filtered and concentrated to dryness. The desired compound was isolated and purified in accordance with the procedure of the previous example.

EXAMPLE XXXIII

21-Methyl-$\Delta^4$-Pregnene-17$\alpha$,21-Diol-3,11,20-Trione 21-Acetate

A solution containing 25 mg. of 16$\beta$-bromo-21-methyl-$\Delta^4$-pregnene-17$\alpha$,21-diol-3,11,20-trione 21-acetate in 2 ml. of glacial acetic acid is treated portionwise with zinc dust on the steam bath for a total of 15 minutes. The residual zinc dust is removed by centrifugation and the acetic acid solution evaporated to dryness in vacuo. The residue was triturated with ethyl acetate and ether, filtered and dried.

What is claimed is:

A compound selected from the group consisting of those having the formula

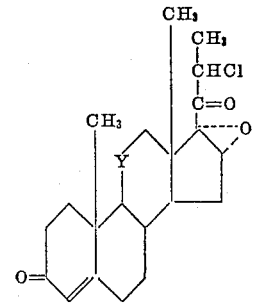

and the $\Delta^1$-, $\Delta^6$- and $\Delta^{1,6}$-dehydro analogs thereof wherein Y is selected from the group consisting of

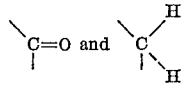

References Cited in the file of this patent

UNITED STATES PATENTS

| | | |
|---|---|---|
| 2,832,772 | Farrar et al. | Apr. 29, 1958 |
| 2,874,154 | Stork et al. | Feb. 17, 1959 |
| 2,912,444 | Ehrhart et al. | Nov. 10, 1959 |